United States Patent
Herwig et al.

(10) Patent No.: US 8,028,916 B2
(45) Date of Patent: Oct. 4, 2011

(54) METHODS AND APPARATUS FOR POSITIONING OBJECTS FOR SCANNING BY A HYBRID LASER AND IMAGING SCANNER

(75) Inventors: Nathaniel C. Herwig, Lawrenceville, GA (US); Sik Piu Kwan, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 1008 days.

(21) Appl. No.: 11/835,465

(22) Filed: Aug. 8, 2007

(65) Prior Publication Data

US 2009/0039166 A1 Feb. 12, 2009

(51) Int. Cl.
*G06K 7/10* (2006.01)

(52) U.S. Cl. .............................. 235/462.21; 235/472.01

(58) Field of Classification Search .......... 235/462.01–462.45, 472.01, 472.02, 235/472.03, 454
See application file for complete search history.

(56) References Cited

U.S. PATENT DOCUMENTS

| | | | | |
|---|---|---|---|---|
| 6,223,988 | B1* | 5/2001 | Batterman et al. | 235/472.01 |
| 6,502,754 | B1* | 1/2003 | Bhatia et al. | 235/472.01 |
| 7,281,657 | B2* | 10/2007 | Patel et al. | 235/454 |
| 2003/0141370 | A1* | 7/2003 | Hamilton et al. | 235/462.45 |
| 2006/0289645 | A1* | 12/2006 | Schuessler | 235/451 |
| 2009/0001171 | A1* | 1/2009 | Carlson et al. | 235/462.41 |
| 2009/0108076 | A1* | 4/2009 | Barkan et al. | 235/462.48 |

* cited by examiner

*Primary Examiner* — Thien M Le
(74) *Attorney, Agent, or Firm* — Peter Priest; Paul W. Martin (57) ABSTRACT

Systems and techniques for assuring proper presentation of a bar code for imaging scanning in a hybrid laser and imaging bar code scanner. A scanner includes elements for laser bar code scanning and imaging bar code scanning, and includes indicia for assuring proper presentation by a user of a bar code suited to imaging scanning. Indicia may include targeting features on a scan window, designed so as to minimize interference with bar code scanning, or may alternatively include features alongside a scan window. Alternative indicia may include removable holders for securing an object bearing a bar code in an appropriate position, and further alternative indicia may include visible targeting beams so that a user can be assured that imaging scanning may be satisfactorily performed on bar code placed in a visible targeting beam.

16 Claims, 6 Drawing Sheets

METHODS AND APPARATUS FOR POSITIONING OBJECTS FOR SCANNING BY A HYBRID LASER AND IMAGING SCANNER

FIELD OF THE INVENTION

The present invention relates generally to improvements to scanning encoded information. More particularly, the invention relates to improved systems and techniques for insuring optimum positioning of objects for scanning by a combined laser and imaging scanner.

BACKGROUND OF THE INVENTION

Bar code scanners have been used for many years for fast and convenient identification of objects, such as products entered into a sales transaction. As technology has improved, the variety of bar codes and other identification indicia has increased. One particularly promising additional technology is the use of imaging for scanning indicia such as a bar code. In contrast to conventional laser bar code scanning, imaging scanning captures a visual image of an object of interest and processes the image in order to extract relevant information. An imaging scanner often provides improved capability of reading very small bar codes and two dimensional bar codes, as compared to a conventional laser scanner. The use of an imaging scanner is made more efficient if the object to be scanned, such as a bar code, is presented to the imager in a position and orientation that provides the best perspective for the imager.

Integrating an imaging scanner into a conventional laser scanner provides improved versatility in scanning operations, allowing for laser scanning of some bar codes and imaging scanning of bar codes more suited to imaging scanning. The need to accommodate the facilities needed for both types of scanning, and to provide proper presentation stages for both types of scanning, imposes various constraints on the design and operation of the scanner. Constraints may be imposed, for example, on the manner of presentation of a bar code to be subjected to imaging scanning. If an imager is integrated into a conventional scanner, the positioning of the imager within the conventional scanner, and the need to operate the imager in conjunction with the conventional scanner, may dictate that a bar code be positioned facing away from the operator when presented to the imager. Such positioning prevents an operator from easily seeing the bar code and may make it more difficult for an operator to place the bar code in an ideal position for scanning by an imager.

SUMMARY OF THE INVENTION

In one aspect, the present invention addresses such problems, as well as others, by providing visible indications to an operator for proper positioning of a bar code. The indications may, for example, include markings on a scan window or on a scanner enclosure, a guide for indicating placement of a bar code, or a visible indicator, such as a beam or projection illuminating the bar code when the bar code is properly positioned.

A more complete understanding of the present invention, as well as further features and advantages of the invention, will be apparent from the following Detailed Description and the accompanying drawings.

DETAILED DESCRIPTION

Figure 1:
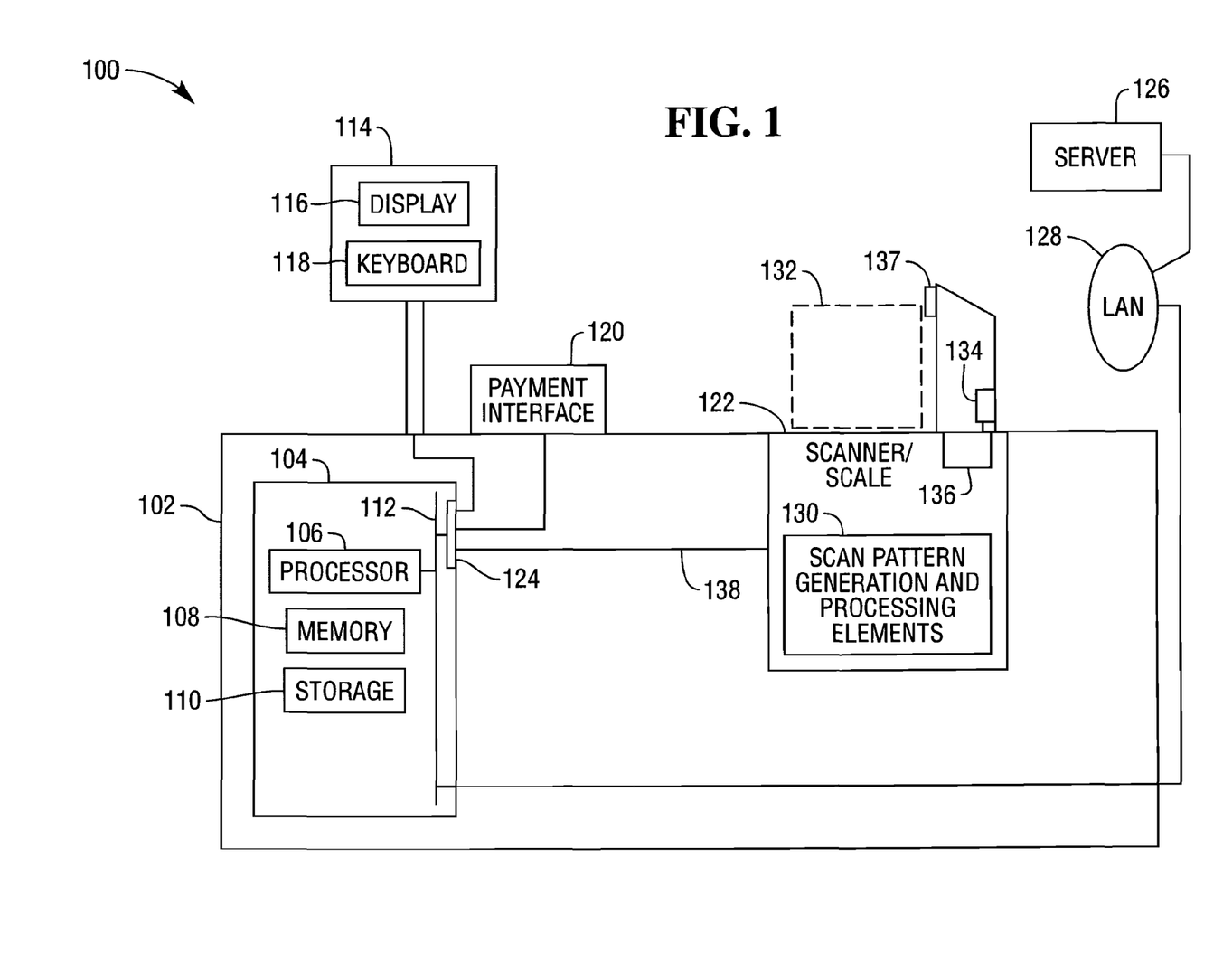
FIG. 1 illustrates a checkout system employing a scanner according to an aspect of the present invention.

FIG. 1 illustrates a checkout system 100 according to an aspect of the present invention. The system 100 includes a point of sale terminal 102, suitably including a computer 104. The computer 104 may suitably include a processor 106, high speed memory 108, long term storage 110, all communicating over a bus 112. The terminal 102 may employ a user interface 114, including a display screen 116 and keyboard 118. The user interface 114, as well as a payment interface 120, and scanner/scale combination 122, communicate with the computer 104 through one or more interface connections, such as the interface 124. The interface 124 may suitably be a set of universal serial bus (USB) ports, a combination of USB ports and other types of ports, or any other suitable combination of communication connectors. The computer 104 may communicate with a central server 126 over a local area network 128.

The scanner/scale combination 122 includes laser scan pattern generation and processing elements 130, for generating a scan pattern comprising tracings of a scan beam onto an object presented within a scan zone 132 of the scanner/scale 122. The scanner/scale combination 122 also includes a camera 134 and image processing elements 136, for capturing an image of indicia of interest, such as a bar code to be processed through image scanning, and processing the captured image to extract information, such as bar code information, from the indicia. The scanner 122 may be designed in numerous different ways, with the camera 134 placed in alternative positions, and each potential design may call for a different ideal presentation location for an object bearing a bar code. In addition, various objects bearing indicia may be adapted for best presentation in one or another location with respect to the scanner 122.

As the checkout process proceeds, some objects are presented in an appropriate location for laser scanning, while other objects are presented in an appropriate location for imaging scanning. Because imaging scanning is often used for bar codes that are smaller or otherwise more difficult to read than typical bar codes easily read by laser scanning, precise presentation of a bar code in an ideal location is helpful in scanning the bar code. Therefore, a scanner such as the scanner 122 suitably provides indications, for example, in the form of markings, attachments, or visible beams, indicating correct positioning for a bar code to be read by imaging scanning. Examples of scanners providing such indications are illustrated in FIGS. 2-5 and discussed below.

In addition, if desired, a small display screen, such as the screen 137 may be provided. The screen 137 may suitably be a liquid crystal display (LCD) screen. The screen 137 displays the view of the camera 134, showing a user how a bar code appears to the camera 134 as the bar code is being positioned for image capture.

Figure 2:
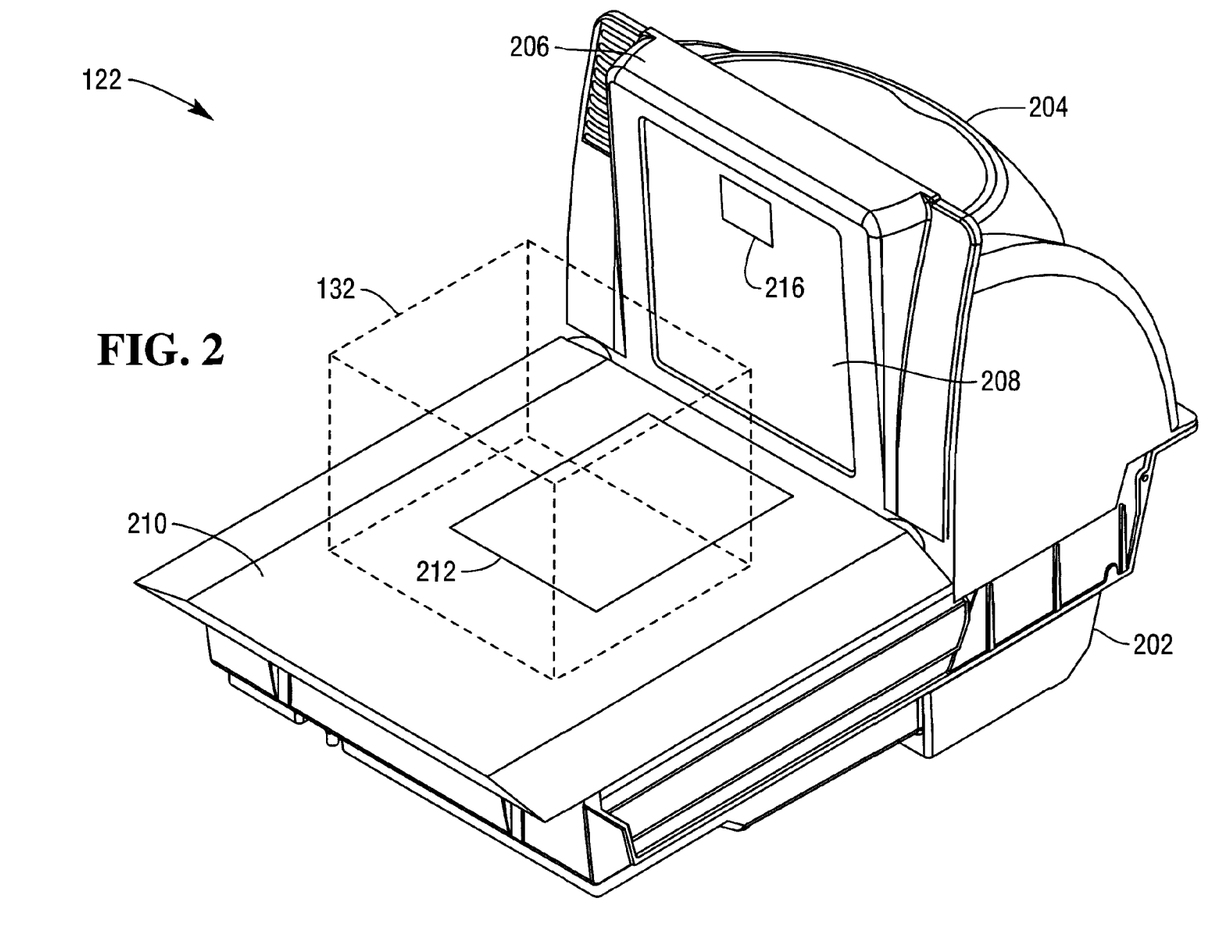
FIG. 2 illustrates a scanner including position markings on a scan window according to an aspect of the present invention.

FIG. 2 illustrates an exemplary scanner 122 according to an aspect of the present invention. The scanner 122 includes a base portion 202 and a tower portion 204. The tower portion includes a frame 206, securing a vertical scan window 208, and the base portion includes a top plate 210, securing a horizontal scan window 212. The scanner 122 includes the scan pattern generation and processing elements 130, the camera 134, and the image processing elements 136, but these elements cannot be seen in FIG. 2.

The scanner 122 is used to scan a bar code by placing the bar code in an appropriate position to allow for conventional laser scanning, image scanning, or whichever scanning method produces the best results for the particular bar code. In order to perform conventional laser scanning, the bar code is suitably placed in or moved through the scan volume 132 so that it is appropriately positioned to intersect a scan pattern and scatter light from the scan pattern back into the scanner 122. In order to perform image scanning, the bar code is suitably positioned so that it is presented to the camera 134 so as to allow the camera 134 to capture an image suitable for processing. If desired, a scanner such as the scanner 122 may be designed so that a bar code may be well presented for both conventional and image scanning, allowing for bar code detection and processing using both techniques simultaneously, with the results of each technique being evaluated and the results used being those judged best according to some chosen standard, such as the first results produced, or the results deemed most likely accurate.

Image scanning typically produces the best results when a bar code is presented to an imaging element, such as a digital camera, in a relatively narrowly defined perspective, with respect to both position and angle of presentation of the bar code. If the imaging element is concealed within the scanner 122, taking images through the scan window 208 or 212, an operator may not know which of the scan windows is the correct window for presentation. Therefore, in the illustrated embodiment, the scanner 122 includes a suitably transparent targeting feature 216 at an appropriate position on one of the windows 208 and 212. In the particular case illustrated, the targeting feature 216 appears on the vertical window 208, but the location on any particular scanner design will depend on the location of the imaging element used in the scanner design.

The targeting feature 216 is designed so as to interfere as little as possible with the laser scan pattern exiting through the scan window. In the present state of the art, red lasers are used for laser bar code scanning, so one suitable choice is for a lightly red shaded transparent area on the appropriate window. A future change in the laser color used could be accommodated by an appropriate change in the shading color chosen for the targeting feature 216.

Another suitable choice is for the targeting feature 216 to be drawn on the window in such a manner that it does not interfere with the emission of a scan pattern. This can be accomplished, for example, by using dashed lines for the targeting feature 216, and placing the markings comprising the lines so that they are positioned only where there is no emission of laser light from the window where the targeting feature 216 appears.

Figure 3:
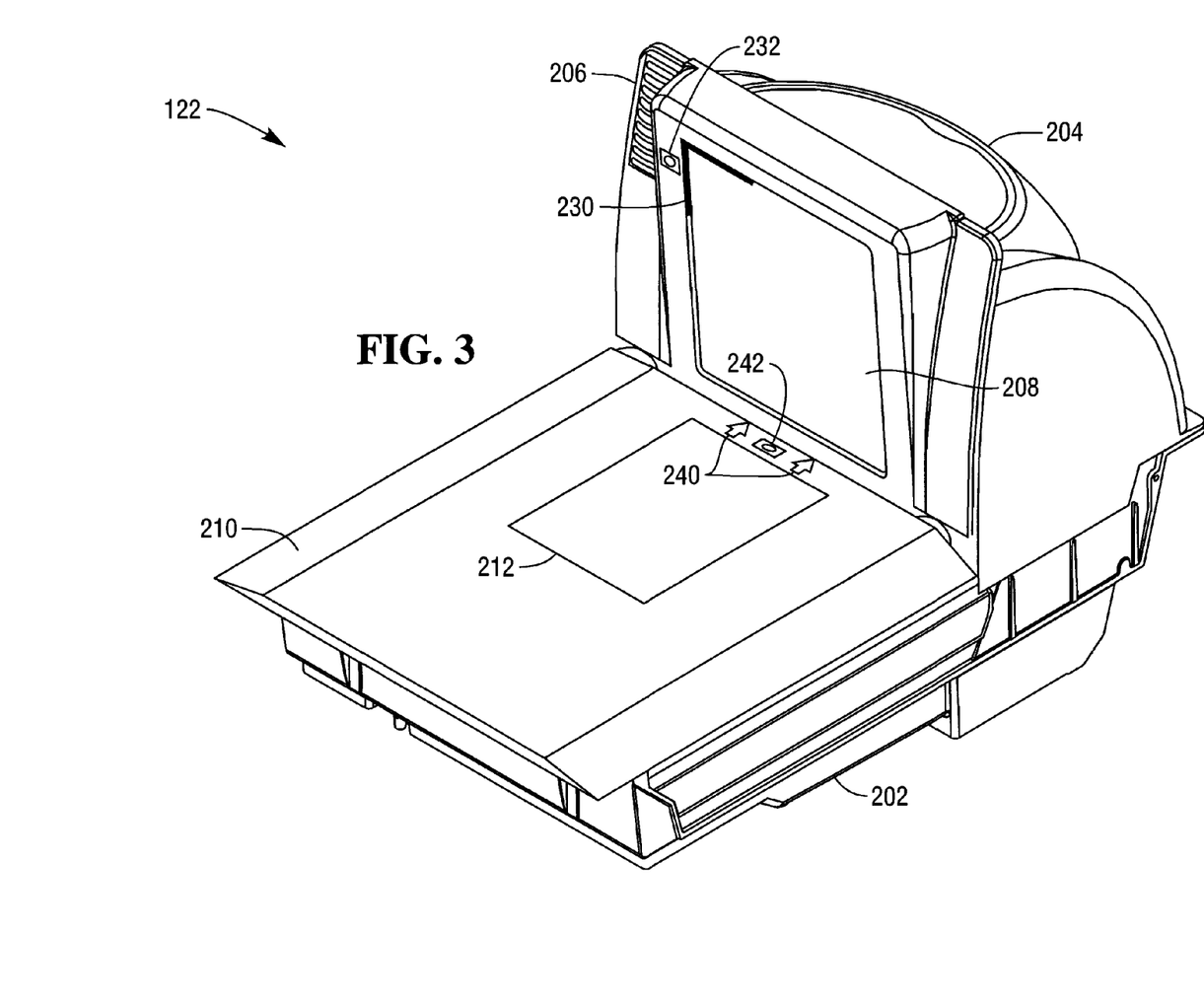
FIG. 3 illustrates a scanner including position markings on a scanner enclosure according to an aspect of the present invention.

FIG. 3 illustrates the scanner 122, comprising selected elements according to an alternative aspect of the present invention. The scanner 122 includes the base 202, tower portion 204, frame 206, vertical scan window 208, top plate 210, and horizontal scan window 212. In the illustrated embodiment, the scanner 122 includes a targeting feature 230. The targeting feature 230 illustrated here is a marking placed at an appropriate location on the vertical frame 206, and provides an indication for proper placement of an object, such as a loyalty card or driving license, that is to be placed against the vertical window 208 for image scanning. By placing the targeting feature 230 away from the window 208, the need to adapt the targeting feature to avoid interfering with laser scanning is reduced.

In the embodiment illustrated here, the targeting feature 230 marks the proper placement of an object bearing a bar code or other indicia to be read by an imaging element of the scanner 122. For example, an identification document such as a loyalty card may suitably be placed flat against the scan window 208 and aligned with the targeting feature 230. The targeting feature 230 may suitably be integrated into the frame 206, and may suitably include backlighting that is illuminated while the imaging element is active and dark while the imaging element is inactive, thereby indicating when it is appropriate to present a bar code for reading by the imaging element. An icon, such as a camera shaped icon 232, may also be placed at an appropriate position on the scanner 200, for example, integrated into the frame 206, and illuminated when the imaging element is active. Such an icon can be illuminated at appropriate points in the transaction, in order to help an operator to know when during a sales transaction it is required or appropriate to scan a card or drivers license, for example.

Alternatively or in addition, a targeting feature 240 may be placed on the top plate 210 as shown, with a camera icon 242 integrated into or otherwise placed on the top plate, in order to target a position toward the bottom center of the vertical window 208. Reversing the orientation of the arrows comprising the targeting feature 240 would target a position on the horizontal scan window 212. Numerous other positions for targeting features may be contemplated, depending on the desired scanning position of an object to be subjected to image scanning.

Figure 4:
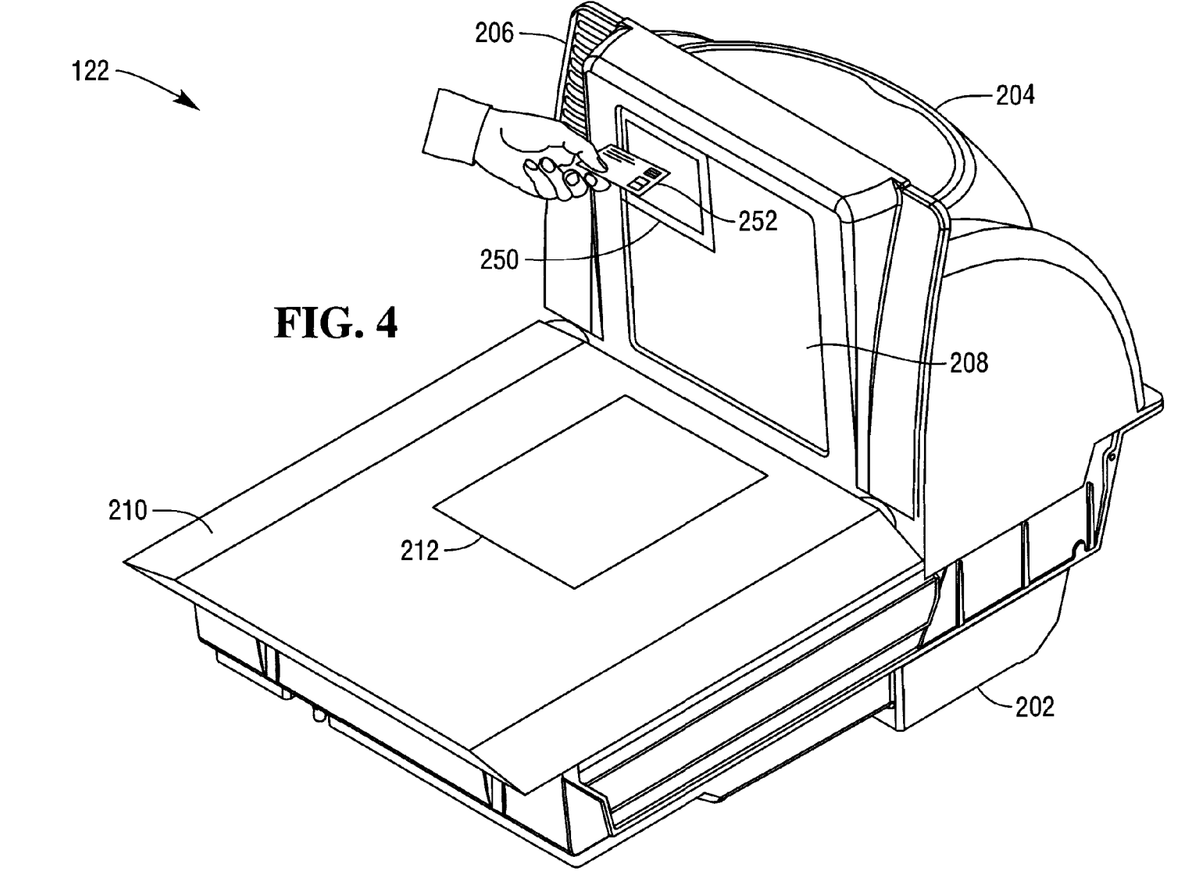
FIG. 4 illustrates a scanner including a removable positioning guide according to an aspect of the present invention.

FIG. 4 illustrates the scanner 122, modified to conform to a further alternative embodiment of the present invention. The scanner 122 includes the base 202, tower portion 204, frame 206, vertical scan window 208, top plate 210, and horizontal scan window 212. In the illustrated embodiment, the scanner 122 implements a targeting feature 250 that may be moved into and out of position as desired. In the embodiment shown here, the targeting feature 250 comprises a guide into which an object such as an identification card 252 may be placed. The identification card 252 may suitably be a loyalty program card, driver's license, or other identification card used for one of a number of purposes connected with the transaction, such as age verification for the purchase of age restricted products, personal identification in connection with financial details of the transaction, or identification as a loyalty program member. The targeting feature holds the card 252, or other object, in a desired position for image scanning. The targeting feature 250 may suitably be hinged or detachable, so as to be removed from the window 208 when not in use, or the targeting feature 250 and the base 202 or tower 204 may be designed so that the targeting feature 250 may be stored in a recessed position within the base 202 or tower 204 and able to be brought into position for use and recessed again when not in use.

Figure 5:
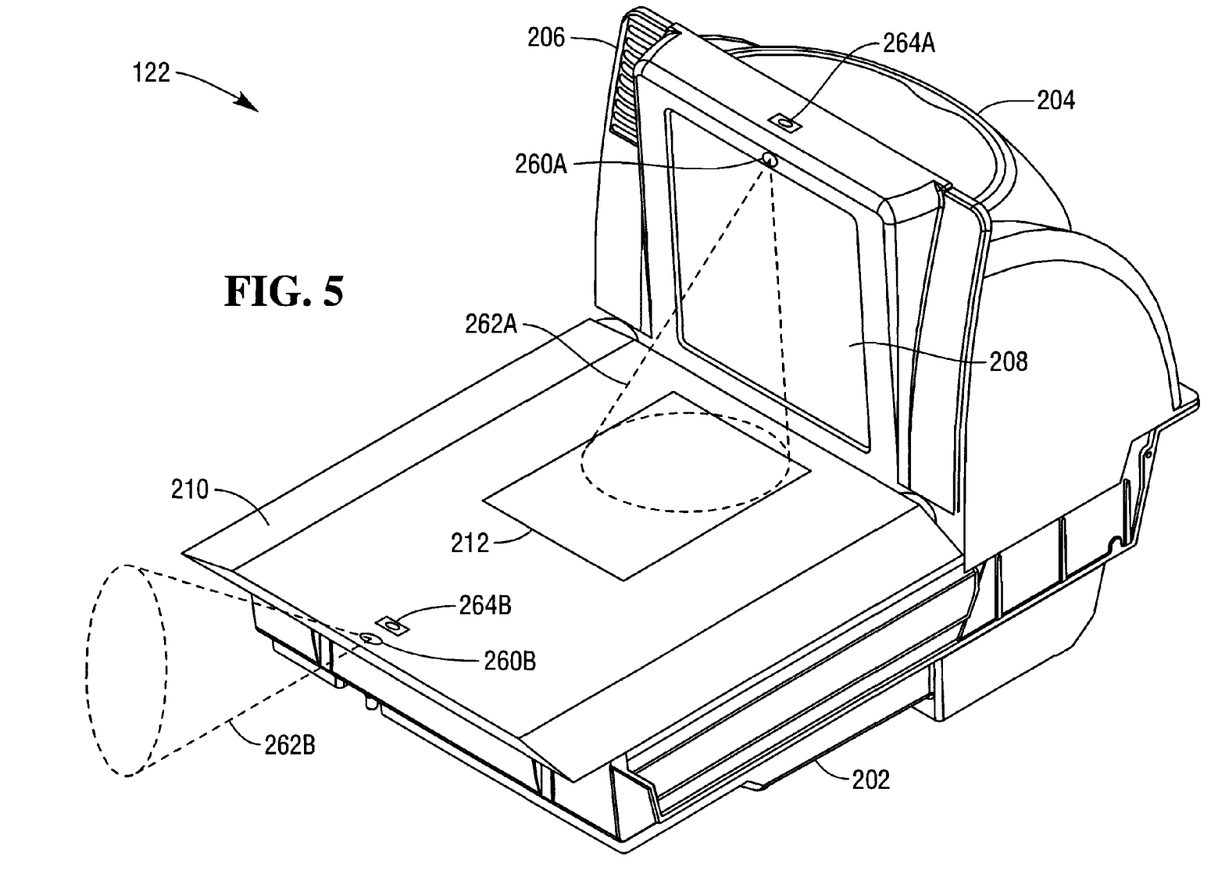
FIG. 5 illustrates a scanner emitting a visible position indicator according to an aspect of the present invention.

FIG. 5 illustrates the scanner 122, modified according to a further aspect of the present invention. The scanner 122 includes a base 202, tower portion 204, frame 206, vertical scan window 208, top plate 210, and horizontal scan window 212. In this embodiment, the scanner includes two imaging elements similar to the imaging element 134, placed directly behind the apertures 260A and 260B so as to project visible targeting beams, such as the beams 262A and 262B. An imaging element may be integrated into the bezel that provides a receptacle for the frame 206, so as to project a beam through the aperture 260A, providing for ease of access for repair or replacement, and reducing impact on the design of elements of the scanner 122 such as optics and scanner windows. An alternative placement is inside the optics tower of the scanner 122, at a cost of some increased inconvenience of access, as well as a need to adapt mounting position of the imager, as well as aspects of the scanner 122, for example, by imposing a need to adapt window material to projection of the beams 262A and 262B. The targeting beams 262A and 262B may be projected by an element independent of an imaging element, and may suitably be a light emitting diode, laser, or other element used to project a targeting pattern on an object in the field of view of an imager.

In order to scan an item using image scanning, an operator may simply place the object to be scanned in the targeting beam 262A or 262B. The use of two imaging elements, each producing an imaging beam, is discussed here, but it will be recognized that a scanner such as the scanner 122 will frequently use only a single imaging element, although two or even more imaging elements may easily be implemented.

An imaging system employed in a scanner such as the scanner 122 will typically include additional imaging electronics besides the imaging elements near the apertures 260A and 260B, such as electronics to provide power to the imaging elements, and electronics to process signals generated by the imaging elements. The additional electronics may be concealed within the scanner 122, avoiding interference with the aesthetics of the scanner, and avoiding introducing obstructions into the path of objects being scanned.

Figure 6:
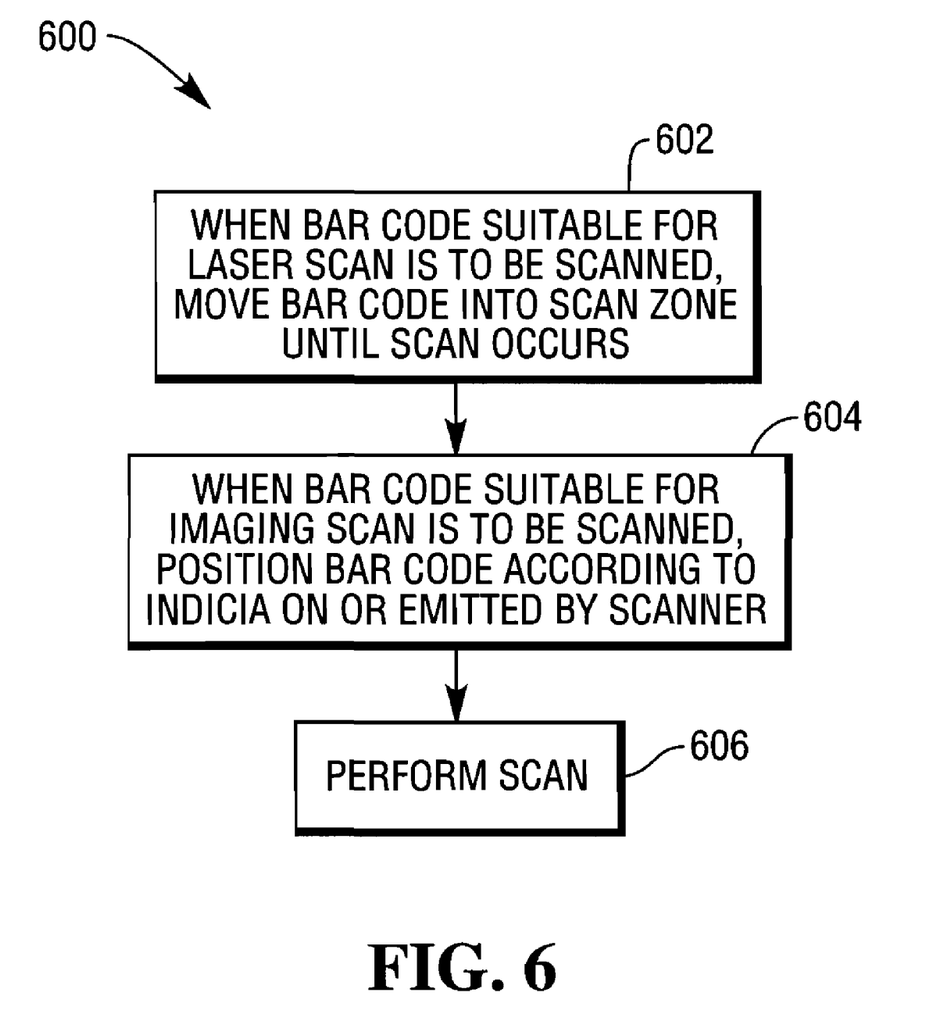
FIG. 6 illustrates a process of position indication and object positioning according to an aspect of the present invention.

FIG. 6 illustrates a process 600 of bar code scanning using a hybrid laser and imaging scanner. The process 600 may suitably be employed using a system such as the system 100 of FIG. 1, using scanners such as the scanner 122 having varying configurations such as those illustrated in FIGS. 2-5. At step 602, when a bar code suitable for laser bar code scanning is to be scanned, the bar code is moved into a scan zone so as to intercept a scan pattern, with the position and orientation of the bar code being adjusted until a scan occurs. At step 604, when a bar code suitable for imaging scanning is to be scanned, the bar code is positioned at a desired position for scanning, according to indicia serving to indicate proper positioning. These indicia may take the form of markings or holders, such as can be seen in FIGS. 2-4 and discussed above, or visible beams emitted by imaging devices, such as can be seen in FIG. 5 and discussed above. At step 606, the scan is performed.

While the present invention is disclosed in the context of a presently preferred embodiment, it will be recognized that a wide variety of implementations may be employed by persons of ordinary skill in the art consistent with the above discussion and the claims which follow below.

We claim:

1. A hybrid laser and imaging bar code scanner, comprising;
    bar code scanning and processing elements for laser scan pattern generation and bar code processing;
    imaging elements for performing imaging scanning of a bar code by capturing a bar code image and processing the image to extract bar code information; and
    indicia indicating positioning for a bar code to be scanned by imaging scanning, the indicia indicating an ideal position for the bar code to allow for efficient scanning wherein the indicia comprise a transparent targeting feature placed on a window of the scanner, the targeting feature being shaded so as to be visible to a user positioning a bar code.

2. The scanner of claim 1, wherein the targeting feature is shaded in a color compatible with a wavelength of light emitted by the laser used for bar code scanning, so as to reduce interference of the targeting feature with bar code scanning.

3. The scanner of claim 1, wherein the targeting feature includes broken markings on a scan window, with the design of the targeting feature chosen so as to avoid placement of markings in positions on the scan window where a laser scan beam will emerge.

4. The scanner of claim 1, wherein the imaging elements produce a video feed showing objects being presented for image scanning, the scanner further comprising a display receiving the video feed and showing to a user objects being presented to a user as the objects appear to the imaging elements.

5. A hybrid laser and imaging bar code scanner, comprising;
    bar code scanning and processing elements for laser scan pattern generation and bar code processing;
    imaging elements for performing imaging scanning of a bar code by capturing a bar code image and processing the image to extract bar code information; and
    indicia indicating positioning for a bar code to be scanned by imaging scanning, the indicia indicating an ideal position for the bar code to allow for efficient scanning wherein the indicia comprise markings on a bezel of the scanner, marking a position on a scan window where a bar code should be positioned.

6. A hybrid laser and imaging bar code scanner, comprising;
    bar code scanning and processing elements for laser scan pattern generation and bar code processing;
    imaging elements for performing imaging scanning of a bar code by capturing a bar code image and processing the image to extract bar code information; and
    indicia indicating positioning for a bar code to be scanned by imaging scanning, the indicia indicating an ideal position for the bar code to allow for efficient scanning wherein the indicia comprise markings on a top plate of the scanner, external to a horizontal window of the scanner, indicating a position on the horizontal scan window where a bar code should be positioned.

7. A hybrid laser and imaging bar code scanner, comprising;
    bar code scanning and processing elements for laser scan pattern generation and bar code processing;
    imaging elements for performing imaging scanning of a bar code by capturing a bar code image and processing the image to extract bar code information; and
    indicia indicating positioning for a bar code to be scanned by imaging scanning, the indicia indicating an ideal position for the bar code to allow for efficient scanning wherein the indicia comprise a movable holder into which an object bearing a bar code can be inserted, the holder maintaining the bar code in an ideal position for imaging scanning.

8. The scanner of claim 7, wherein the holder is removable.

9. The scanner of claim 7, wherein the holder can be swung away from the window while still attached to the scanner when not needed for imaging scanning.

10. The scanner of claim 7, wherein the holder can be stored in a recessed position within the scanner when not needed for imaging scanning and moved into position against a scanner window when needed.

11. A method of bar code scanning using a hybrid laser and imaging scanner, comprising the steps of:

when a bar code suited for laser bar code scanning is to be scanned, positioning the bar code in a scan zone of the scanner so that laser scanning occurs; and when a bar code suited for imaging scanning is to be scanned, positioning the bar code in an ideal position for imaging scanning, the ideal position being indicated by indicia on or emitted by the scanner and, wherein positioning the bar code for imaging scanning includes positioning the bar code against a transparent targeting feature on a scan window of the scanner.

12. The method of claim 11, wherein positioning the bar code for imaging scanning includes positioning the bar code against a scan window in a position indicated by markings on a bezel of the scanner.

13. The method of claim 12, wherein positioning the bar code for imaging scanning includes positioning the bar code against a horizontal scan window in a position indicated by markings on a top plate of the scanner.

14. The method of claim 11, wherein positioning the bar code for imaging scanning includes positioning the bar code in a movable holder that can be moved into position when needed and out of position when not needed.

15. The method of claim 11, wherein positioning the bar code for imaging scanning includes positioning placing the bar code in a visible beam emerging from the scanner.

16. The method of claim 15, wherein the visible beam is emitted by an imaging element.

\* \* \* \* \*